Figure 1:
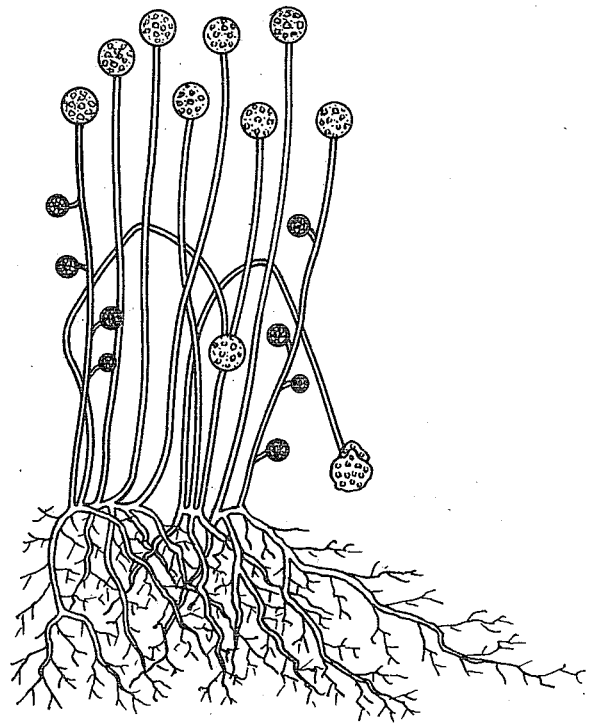

O. SCHMIDT.
PROCESS OF BREEDING MICROBES.
APPLICATION FILED MAR. 25, 1905.

994,660.

Patented June 6, 1911.

UNITED STATES PATENT OFFICE.

OTTO SCHMIDT, OF COLOGNE, GERMANY.

PROCESS OF BREEDING MICROBES.

994,660.

Specification of Letters Patent. Patented June 6, 1911.

Application filed March 25, 1905. Serial No. 252,072.

*To all whom it may concern:*

Be it known that I, OTTO SCHMIDT, a subject of the German Emperor, and resident of Cologne, Germany, have invented certain new and useful Improvements in Processes of Breeding Microbes, of which the following is a specification.

For the immunization of men or animals against disease-germs small quantities of pure breeds of those parasites (bacteria and other microbes) against which men or animals are to be protected are required. Much larger quantities are required if it is intended to produce in the animal body anti-toxic or bactericidal serum and to actively inoculate or immunize animals in such a high degree that their serum can be used for the passive immunization of other organisms.
The breeding of pure specimens of the bacteria, and so on, takes place on an artificially produced culture medium, the constituents of which are empirically so selected as experience has shown them to be the best for the respective kind. For while a large number of them grow on or in all culture mediums which contain nitrogen and carbon in suitable combinations, others are far more particular in their choice, and among these especially the pathogenic kinds, which are of importance for the purpose of immunization; some of them even only grow on culture mediums of quite a definite composition. Whether the culture medium is solid or liquid matters on the whole very little; practical wants generally decide this point. Besides the nourishment an important role is played also by air, temperature and light in all processes of breeding bacteria or parasitically living micro-organisms, as some only grow if air and light are admitted, and others if air and light are excluded, and whereas the majority grow best at a temperature equal to that of the body, a minority grow better at a lower temperature; but with all breeding processes the main thing remains the kind and composition of the culture medium. Each pure cultivation is nothing else but the saprophytic stage of parasitic micro-organisms, as far as under pure cultivation the breeding of parasitic micro-organisms on a dead organic substance is understood. The inanimate culture medium can never offer the same conditions of existence as the living organisms; to this is to be ascribed the fact that the germs of a number of undoubtedly parasitic diseases could thus far not be bred. Some were shown to color the tissue and at least their shape is known, of others we know nothing. They are undoubtedly micro-organisms belonging to the *Protozoa*, which, because they are obligate parasites, can never be saprophytic, that is to say grow on a dead culture medium. A second category of micro-organisms, the facultative parasites, live ordinarily in the animal body, but can also grow saprophytically, but their virulence is thereby so weakened that they can no longer be used for the production of a curative serum.

The object of the present process is: 1, in general to breed already known but hitherto not cultivated and also hitherto unknown parasitic disease-germs belonging to the obligate parasites; 2, to breed and maintain in a pure state the so-called facultative parasites in undiminished virulence outside of the body. This process is based on the consideration that these breedings can only be successful outside of the human or animal body if the respective parasites can, also when bred artificially, develop purely parasitically in the tissue of a living organism, and it consists in offering to the parasites, instead of the living animals, living plants as a culture medium. The plants best suited for this are, for obvious reasons, not the *Phanerogamia* but the *Cryptogamia*, and of these in the first place the lowest kinds living in the water, whose soft spores offer no resistance to the entry of the parasites, but whose plasma offer sufficient nourishment to the parasites to thrive in it. Which plant is the most suitable in every particular case for the respective parasite only experience and experiments can show.

The process can be carried out as follows: In order to breed obligate parasites small and well protected pieces of the diseased tissue are, before other micro-organisms enter, placed directly into the liquid in which the plant is in lively sporulation, or a so-called tissue-culture is first made in the incubator and this is,—after some time, when the parasite has multiplied in the tissue, eventually after the gradual adaptation of the tissue to the room-temperature necessary for the plant—to be added to the culture medium of the plant. With the facultative parasites the same process may be applied, but the saprophytic growth can first take place on a dead culture medium and then the product of this culture be added to the sporulating plant. The parasitic microorganisms enter the spores of the plant and develop themselves—while impeding the germination of the spores—or they are driven with the plasma into the germination-tubes and the growing vegetative system and go there through their course of development or evolution and, being then freed in some way, they attack the spores of the plant, which have in the meantime become fully developed, a process which is repeated until the culture medium is exhausted and the plant dies. At this stage the product of the culture is ready for use, and, after passing through a coarse filter for the purpose of eliminating the more voluminous particles of the plant, it may be used for injections. The particles of the plant still mixed with the parasites may without hesitation be injected with them, for it has been found that they are rapidly absorbed without doing any harm.

By this process, I have succeeded in breeding in a plant the germ of an important group of diseases, the malignant tumors lupus, cankers and the like, which I have proved to be caused by a parasite belonging to the *Protozoa*. I have given a description of said parasite and a statement of my experiences and successes, together with a number of drawings and photographs in my book: "*Mitteilungen aus Dr. Schmidt's Laboratorium für Krebsforschung*, Bd. 1," especially in its first chapter and titled "*Ueber das Vorkommen eines protozoonartigen Parasiten in den malignen Tumoren und seine Kultur ausserhalb des Tierkörpers.*" This animal is to be considered as being an amœba, owing to its appearance, the manner of its motion and its propagation. If not colored, it is, in the state of rest, a round, in the state of motion, an irregular shaped, limpid structure. For its motion limblike processes or pseudopodia are protruded, which are not organic, but form only processes or protuberances of the semi-fluid body of the animal. In sporulating sporocysts are formed, the contents of which break up into a number of little bodies. Said parasite, which I have named by myself *Meristemamaligna* brought upon the usual culture mediums, generally upon a dead culture medium, perishes immediately. But it develops and grows in the spores and fruits of a certain mold-fungus, named *Mucor racemosus*, to which the said parasite is added in the above described manner. Also other fungi are able to serve as culture-plants for the said parasite. Said fungi, and specially the named mold-fungus, vegetate in about all culture mediums today in use for breeding microbes. As a culture medium most suitable for that purpose I have found the so-called peptone-sugar-bouillon or broth.

Figure 2:
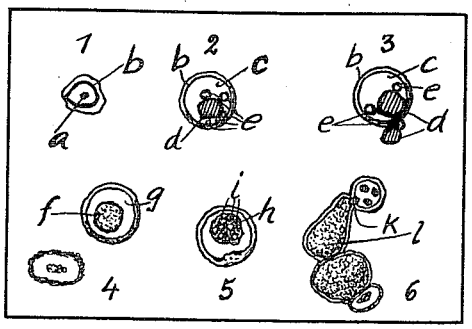

The annexed drawing shows in Figure 1 the mold *Mucor racemosus* in an enlarged scale, and in Fig. 2 the parasite vegetating in and with the mold spores in different conditions and forms, this representation being taken from photographs.

1 shows a swarmer *a* contained in the *Mucor* spore *b* and growing so as to form an amœba, the protoplasm of the *Mucor* spore being completely liquefied; 2 shows an amœba *c* encapsuled, completely filling out the *Mucor* spore; the cyst contains, besides the rest body *d*, two great and some little germs *e;* 3 shows the same, as figure 2, but the germs and rest body being upon the point to leave the double casing; 4 shows an amœba *f* growing in the plasma *g* of bowl-mycelium. 5 shows an oocyst *h* containing ripe spores *i*.

6 shows antheridiums *k* lying tightly to gemmæ *l*.

By the word "swarmer" as used in the foregoing I understand a larval or imperfect condition of the *Protozoa* in question.

What I claim as my invention and desire to secure by United States Letters Patent is—

1. The hereinbefore described process of breeding in pure state microbes which vegetate as parasites in the human and animal body, outside of the animal body and in large quantities sufficient for the immunization of other organisms, consisting in the following steps: the microbes are brought upon and into living plants of the lowest kind, which plants are brought into a suitable culture medium and made to vegetate therein, so that the microbes are made to enter the spores of the plant and to vegetate and multiply therein repeatedly, until the plant dies.

2. A special kind of means for the immunization of men against the malignant tumors, consisting in a filtered liquid containing admixed the pure breeds of those parasites which cause the said diseases, together with the spores and fruits of a certain mold-fungus, named *Mucor racemosus* upon which the parasites were bred, substantially as and for the purpose set forth.

In testimony whereof I have signed my name to this specification in the presence of two subscribing witnesses.

OTTO SCHMIDT.

Signed in presence of—
WILLIAM KUEPPERS,
CHARLES LE SIMPLE.